US008515601B2

(12) United States Patent
Hugues

(10) Patent No.: US 8,515,601 B2
(45) Date of Patent: *Aug. 20, 2013

(54) SYSTEM AND METHOD TO ASSIST IN THE BRAKING OF AN AIRCRAFT ON A LANDING RUNWAY

(75) Inventor: Meunier Hugues, Frouzins (FR)

(73) Assignee: Thales, Neuilly sur Seine (FR)

(*) Notice: Subject to any disclaimer, the term of this patent is extended or adjusted under 35 U.S.C. 154(b) by 0 days.

This patent is subject to a terminal disclaimer.

(21) Appl. No.: 12/848,413

(22) Filed: Aug. 2, 2010

(65) Prior Publication Data
US 2010/0299004 A1 Nov. 25, 2010

Related U.S. Application Data

(62) Division of application No. 11/619,600, filed on Jan. 3, 2007, now abandoned.

(30) Foreign Application Priority Data

Jan. 3, 2006 (FR) .................................... 06 00029

(51) Int. Cl.
G06F 19/00 (2011.01)
G05D 1/00 (2006.01)

(52) U.S. Cl.
USPC ................................... 701/16; 701/1; 701/70

(58) Field of Classification Search
USPC ...................................................... 701/16, 70
See application file for complete search history.

(56) References Cited

U.S. PATENT DOCUMENTS

| 895,929 | A | * | 8/1908 | Woodcock .................... 293/43 |
| 4,410,952 | A | | 10/1983 | DeVlieg et al. |
| 5,968,106 | A | | 10/1999 | DeVlieg et al. |
| 6,991,304 | B2 | | 1/2006 | Villaume |
| 7,441,844 | B2 | | 10/2008 | DeVlieg et al. |
| 7,484,599 | B2 | | 2/2009 | DeVlieg |
| 7,506,941 | B2 | * | 3/2009 | Miller et al. .................. 303/191 |
| 2004/0262994 | A1 | * | 12/2004 | Baumann et al. ............. 303/155 |
| 2005/0192739 | A1 | * | 9/2005 | Conner et al. ................ 701/120 |
| 2005/0261813 | A1 | | 11/2005 | Ryan et al. |
| 2005/0269873 | A1 | | 12/2005 | DeVlieg |
| 2006/0186736 | A1 | | 8/2006 | DeVlieg et al. |
| 2006/0191751 | A1 | * | 8/2006 | Miller et al. ............. 188/1.11 L |
| 2007/0132311 | A1 | * | 6/2007 | Giazotto ....................... 303/126 |

(Continued)

FOREIGN PATENT DOCUMENTS

| EP | 0895929 A2 | 2/1999 |
| EP | 1496413 A1 | 1/2005 |
| WO | 0247977 A1 | 6/2002 |

Primary Examiner — Ian Jen
(74) Attorney, Agent, or Firm — Lowe Hauptman & Ham, LLP

(57) ABSTRACT

A system includes a means of acquiring the position of the aircraft on the runway and its speed in the taxiing phase, a means of storing data concerning the runway and a predefined deceleration law, a function for calculating the distance that the aircraft will have traveled on the runway when it has reached a certain speed and/or the speed that it will have reached when it has traveled a certain distance: the calculated distance makes it possible to adapt the braking by comparison with the distance remaining to reach the end of the runway; the calculated distance makes it possible to adapt the braking by comparison with the distance remaining to reach the end of the runway; the calculated speed makes it possible to adapt the braking by comparison with the maximum speed to take the exit.

17 Claims, 3 Drawing Sheets

(56) References Cited

U.S. PATENT DOCUMENTS

| | | | |
|---|---|---|---|
| 2009/0095576 A1* | 4/2009 | Miller et al. | 188/1.11 E |
| 2010/0191457 A1* | 7/2010 | Harada | 701/201 |
| 2010/0250060 A1* | 9/2010 | Maeda et al. | 701/35 |
| 2010/0286881 A1* | 11/2010 | Cahill | 701/70 |
| 2010/0299004 A1* | 11/2010 | Hugues | 701/16 |
| 2011/0278916 A1* | 11/2011 | DeVlieg et al. | 303/126 |

* cited by examiner

SYSTEM AND METHOD TO ASSIST IN THE BRAKING OF AN AIRCRAFT ON A LANDING RUNWAY

CROSS REFERENCE TO RELATED APPLICATIONS

The present application is a Divisional of U.S. application Ser. No. 11/619,600, filed on Jan. 3, 2007, which is based on and claims priority from French Application Number 06 00029, filed on Jan. 3, 2006, the disclosures of which are hereby incorporated by reference herein in there entirety.

FIELD OF THE INVENTION

The present invention relates to a system and a method to assist in the braking of an aircraft on a landing runway.

BACKGROUND OF THE INVENTION

With the growth of air traffic, the aircraft ground traffic in airport areas is considerably intensified. Whether to get to a take-off runway entry from an embarkation point or to get to a debarkation point from a runway exit, the taxiing maneuvers in the airports today constitute difficult phases.

Various so-called "airport navigation" avionics functions have already been proposed to facilitate the movement on the ground of the aircraft in an airport context. For example, the map of the airport installations can be displayed on board, accompanied by relevant text information. This display can be complemented by various functions, such as a zoom to enlarge sectors defined by the pilot or such as route functions. The position of the airplane can also be displayed and alerts can be raised when the airplane begins a dangerous maneuver, such as an unauthorized approach to a runway, or a nonregulatory maneuver, such as the entry onto a runway in the reverse direction. The position of the other airplanes present on the site can also be displayed and anti-collision functions on the ground can be proposed.

Among the so-called "airport navigation" functions, the management of runway exits after landing to get to a taxiway is a critical task because it conditions both the good operation of the airport and the good operation of the aircraft. Runway occupancy times for landing that are longer than necessary are a source of waiting delays leading to an excess consumption of fuel for the aircraft in approach phase and a slowing down in the rate of landings.

Runway occupancy times that are longer than necessary are often caused by poor management of the runway exits. In practice, each landing runway has several exits, staged along the runway. Leaving the runway by taking one of the first exits reduces the occupancy time of the runway and also the quantity of fuel burnt in the landing phase, which is not inconsiderable bearing in mind that for a flight of approximately one hour, the quantity of kerosene consumed in taxiing can represent approximately 5% of the total quantity of kerosene consumed. However, optimizing the runway exit is not easy, because there are numerous parameters involved: the state of the surface of the runway, weather conditions, the weight and condition of the aircraft, in particular of the tires and of the braking system. Such is, moreover, why the runway exit is never planned, simply suggested. Furthermore, it is not enough to apply maximum braking to take the first exit, since the brakes can start to overheat which causes premature wear and compromises the profitability of the airplane.

The current solution consists, for the pilot, after the front landing gear has touched the ground, in initially reversing the thrust of the engines. Then, in a second stage, when the speed has passed below a certain speed threshold below which the brakes are effective, he operates the brake pedals acting on the wheels. The runway exit is chosen at a guess by the pilot, who visually estimates the first exit that he can reach at a speed less than or equal to the maximum speed allowable to take that exit. The maximum allowable speed to take an exit is the speed above which taking the exit presents a risk given the angle that the exit forms with the runway. This angle can range at least up to 90 degrees and the maximum speed reduces as the angle increases. Quite often, the pilot is forced to add supplementary thrust to get to a more distant exit because it is extremely improbable to reach an exit just at the moment when its maximum allowable speed is reached. By this method, clearly the safety conditions are given priority. In particular, in the case of a supplementary thrust, the problems of excess consumption of kerosene and excessive occupancy of the runways are largely disregarded.

The pilot can also be assisted by an automatic braking system, called "auto-brake", which enables the pilot to select a deceleration level on an ascending scale ranging from 1 to 2, from 1 to 3 or from 1 to 5 depending on the airplane model. The system is started up immediately after the front landing gear has touched the ground and brakes the airplane to a complete stop in accordance with the deceleration level chosen by the pilot. The system is fixed and takes no account either of the particular landing conditions, such as the state of the runway or the weather conditions, or of the speed of the airplane when it touches down. It guarantees no stopping distance, the latter is variable even for a given deceleration level. It is up to the pilot to compensate for the lack of flexibility of the "auto-brake" system by taking over when he visually estimates that he can take an exit. For this, he simply has to operate the brake pedals to deactivate the system. The result is the same as for braking without the help of the "auto-brake" system: there is often a need to add supplementary thrust to get to a more distant exit. Economically, this solution is therefore not the best.

Moreover, during the landing, the pilot does not have any way of checking in advance that the length of runway remaining in front of his airplane is sufficient to complete his landing without overshooting the end of the runway. The availability of such information enables the pilot to judge sufficiently in advance if it is wise to go around to try a new approach.

The object of the invention is to optimize the occupancy time of a runway by an aircraft when landing and to optimize the fuel consumption after the wheels touch down. Its main aim 1s to avoid having to add supplementary thrust again to get to a more distant exit and to signal any risk of overshooting the end of the runway. When the front landing gear touches down, it is a matter of constantly estimating whether the deceleration level is appropriate and deducing from this if there is a need to increase or reduce the braking.

To this end, an object of the invention is a system and a method to assist in the braking of an aircraft on a landing runway.

The system comprises a means of acquiring the position of the aircraft on the runway and its speed in the taxiing phase, a means of storing data concerning the runway where the aircraft is landing and a predefined deceleration law. It also comprises a function for calculating the distance that the aircraft will have traveled on the runway when it has reached a certain speed and/or the speed that it will have reached when it has traveled a certain distance. The distance and/or the speed are calculated assuming that the speed of the aircraft decreases according to the stored deceleration law.

Advantageously, the storage means may contain the position characterizing a runway start or end point and the length of the runway. The calculation function may determine the distance to be traveled by the aircraft to reach a zero speed. The calculated distance makes it possible to adapt the braking by comparison with the distance remaining to reach the end of the runway.

Advantageously, again, the storage means may contain the position characterizing a runway start or end point, the length of the runway and the controlled speed of the aircraft below which it can perform any maneuver on the ground. The calculation function can determine the distance to be traveled by the aircraft to reach the controlled speed. The calculated distance makes it possible to adapt the braking by comparison with the distance remaining to reach the end of the runway. The controlled speed is generally a predefined value for the type of airplane concerned, such as 10 knots, for example.

Advantageously, again, the storage means may contain the position of the point characterizing a runway exit and the maximum speed to take that exit. The calculation function may determine the speed that the aircraft will have reached on the runway when it has traveled the distance to the exit. The calculated speed makes it possible to adapt the braking by comparison with the maximum speed to take the exit. The maximum exit speed can be a predetermined value, such as 30 knots, for example.

In a particular embodiment, the system may include an automatic braking module to increase or reduce the braking without the intervention of the pilot.

An audible alert module or a visual alert module may raise an alert if the stopping distance or the distance to reach the controlled speed of the aircraft is greater than the distance remaining to reach the end of the runway or if no exit can be reached at a speed less than or equal to its maximum exit speed.

A display module may be used to display the stopping distance or the distance to reach the controlled speed or even the speeds at the exits. The current position of the aircraft on the runway may even be graphically represented, as can the stopping distance or the distance to reach the controlled speed of the aircraft. The tendency to shorten or lengthen the stopping distance or the distance to reach the controlled speed of the aircraft may also be displayed graphically.

Advantageously, the exits may be graphically represented. If necessary, the graphic representation of an exit already passed can be different from the graphic representation of an exit not yet passed, or only the exits not yet passed can be graphically represented. If necessary, only the exits that can be reached at a speed less than their maximum exit speed are graphically represented, or the graphic representation of the exits that can be reached at a speed less than or equal to their maximum exit speed can be different from the graphic representation of the exits that cannot be reached at a speed less than or equal to their maximum exit speed.

A mechanism may prevent the jerking around of the moving graphic representations of the stopping distance or of the distance to reach the controlled speed of the aircraft, or even prevent the blinking of the fixed graphic representations of the exits that can be reached or not at a speed less than or equal to their maximum exit speed.

In one embodiment, the graphic representations of the exits may be different in automatic braking mode and in manual braking mode.

Another object of the invention is a method to assist in the braking of an aircraft on a landing runway. The method comprises a phase of recovering data concerning the aircraft or concerning the runway where the aircraft is landing, a phase of acquiring the position of the aircraft on the runway and its speed in the taxiing phase and a phase of calculating the distance that the aircraft will have traveled on the runway when it has reached a certain speed and/or the speed that it will have reached when it has traveled a certain distance. The distance and/or the speed are calculated assuming that the speed of the aircraft decreases according to a predefined time function.

Advantageously, the position characterizing the start or the end of the runway and the length of the runway are recovered in the data recovery phase and the distance that the aircraft will have traveled on the runway when it has reached a zero speed is calculated in the calculation phase, the calculated distance making it possible to adapt the braking by comparison with the distance remaining to reach the end of the runway. If necessary, this comparison is made visually by the pilot.

Advantageously, again, the position characterizing the start or the end of the runway, the length of the runway and the controlled speed of the aircraft below which it can perform any maneuver on the ground are recovered in the data recovery phase and the distance that the aircraft will have traveled on the runway when it has reached its controlled speed is calculated in the calculation phase. The calculated distance makes it possible to adapt the braking by comparison with the distance remaining to reach the end of the runway. If necessary, this comparison is made visually by the pilot.

Advantageously, again, the position characterizing a runway exit and the maximum speed to take this exit are recovered in the data recovery phase and the speed that the aircraft will have reached on the runway when it has traveled the distance to the exit is calculated in the calculation phase. The calculated speed makes it possible to adapt the braking by comparison with the maximum speed to take the exit. If necessary, this comparison is made visually by the pilot. In one particular embodiment, the position characterizing a runway exit and the angle that this exit makes with the axis of the runway are recovered in the data recovery phase, this angle making it possible to deduce a maximum speed to take this exit. The speed that the aircraft will have reached on the runway when it has traveled the distance to the exit is calculated in the calculation phase, the calculated speed making it possible to adapt the braking by comparison with the maximum speed to take the exit.

For example, the distance and/or the speed may be calculated assuming that the speed of the aircraft decreases according to a time-dependent function only, if necessary according to a linear time function. However, the distance and/or the speed may also be calculated assuming that the speed of the aircraft decreases according to a function depending on time and on other variables characterizing the instantaneous braking quality given the state of the runway or of the aircraft and being estimated when taxiing on this runway.

For example, again, the distance and/or the speed may be calculated by taking into account only the speed component along the axis of the runway. The axis of the runway may, for example, be determined by extraction from an airport database containing the position of the thresholds and of the ends of the runway or containing the geographic orientation of the runway. It may also be obtained by calculation based on the coordinates of notable points of the runway on which the aircraft is, such as the thresholds or the ends of the runway obtained from an airport database. More simply, the axis of the runway may be supplied by on-board systems.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
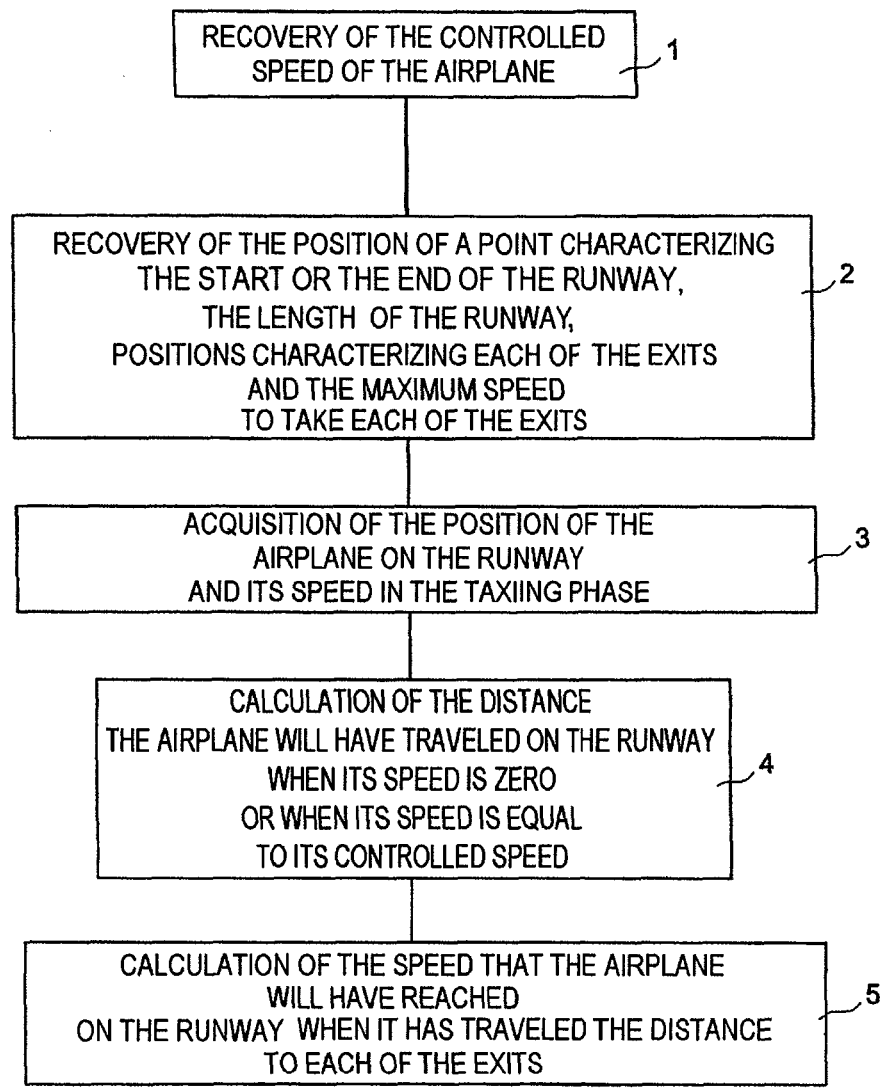
FIG. 1, by a flow diagram, the possible steps of the method according to the invention, FIG. 2, by a block diagram, an exemplary architecture of an "airport navigation" component implementing the system according to the invention, FIG. 3, by a screen view, an exemplary graphic display using the distances and speeds calculated in the exemplary embodiment of FIG. 2.

FIG. 1 illustrates by a flow diagram the possible steps of the method according to the invention.

It comprises a phase 1 of recovery of the controlled speed of the airplane, which is the speed below which the airplane is capable of performing any maneuver while taxiing. For example, for an airliner it can be of the order of 10 to 20 knots. Trying a demanding maneuver, such as a half-turn for example, above this speed could damage the front landing gear or even result in loss of control of the airplane. Only undemanding maneuvers, such as gentle turns, can be undertaken without risk above this speed. The controlled speed depends on the type of airplane and, generally, the controlled speed reduces as the weight of the airplane increases.

The method also includes a phase 2 of recovery of the position of a point characterizing the start or the end of the runway, the length of the runway, positions characterizing each of the exits from the runway and the maximum speed to take each of the exits. For example, the position of the runway start or end point and the positions of the runway exits can be expressed by latitude, longitude and altitude. The length of the runway can be expressed in meters. The maximum speed to take an exit can be recovered in knots. Thus, for an exit forming with the runway an angle of around 90 degrees, its maximum exit speed can be of the order of 10 knots, which corresponds approximately to the controlled speed of an airliner. However, there are also exits that form with the runway an angle significantly lower, approximately 30 to 40 degrees, which make it possible to leave the runway at speeds of up to 50 knots and sometimes a little more. They are called high speed exits. Thus, it is important to note that sometimes, for the same deceleration, it is possible to take one exit and not the next. The first exit can be a high speed exit and the next exit, very close, not a high speed exit. Consequently, it is only when it has reached its controlled speed that the airplane can take any exit, without taking account of the maximum exit speeds.

The method also includes a phase 3 of acquiring the position of the airplane on the runway and its speed in the taxiing phase. As described below, this is done using on-board sensors such as inertial unit or navigation computer or even using a satellite triangulation positioning system. From the moment when the landing gear has touched down, the aim 1s primarily to estimate the position of the airplane on the runway. For example, using a satellite triangulation positioning system, its latitude, its longitude and its altitude can be measured accurately. The speed of the airplane is supplied by on-board sensors, for example an inertial unit. Possibly, if the deceleration of the airplane on the runway is not supplied by on-board sensors, a navigation computer can deduce it easily from the speed variation within a relatively short time interval. In practice, this measured value can, if necessary, be used as a constant deceleration value and give the speed trend law.

The method also includes a phase 4 of calculating the distance that the airplane will have traveled from its current position on the runway when its speed is zero or when its speed is equal to its controlled speed. This is done based on the current position of the airplane which is taxiing on the runway, its instantaneous speed and a deceleration law making an assumption on the trend of the speed of the airplane. Advantageously, it can be assumed that the speed decreases to a complete stop following a function dependent only on time, independently of any other parameters such as the state of the runway and/or the outside temperature, which does, however, partly characterize the grip of the runway surface, or the heating of the brakes. For example, this function can be quite simply a function decreasing linearly over time, which corresponds to a constant deceleration. However, it is also possible to envisage a more complex function dependent on time and also on other parameters, such as the state of the runway and/or the outside temperature, the heating of the brakes mentioned previously, and which can be measured during the braking phase, or the state of the runway that can come from an airport database. The duly calculated distances can be less than or greater than the length of runway remaining in front of the airplane. However, in particular, if the stopping distance is greater than the remaining length of the runway, the pilot must necessarily increase the braking or take an exit. Otherwise, he would overshoot the end of the runway. It is important to note that it is absolutely necessary to increase the braking until the stopping distance is less than the remaining length of the runway. In practice, before even taking an exit, it is vitally important to have, at the end of the runway, a zero speed or at least a controlled speed, above all if the runway does not have an end-of-runway exit. In reality, the stopping distance and the distance to reach the controlled speed have an element of urgency from the moment when the wheels touch down, because if it proves that the remaining runway length is not sufficient to stop and/or exit in total safety, the pilot must go around to re-ascend, and do this as early as possible. Any delay in this action correspondingly reduces the length of runway available to perform such re-ascent in total safety. The stopping distance and the distance to reach the controlled speed are, moreover, a precious aid to adjusting the braking before the last exit is passed, because the airplane could pass the last exit at a speed scarcely greater than its maximum speed and then be obliged to do a half-turn on the runway and go back along it to get back to the exit, or even no longer have enough distance to stop before the end of the runway. Allowing for this, the pilot makes sure of being able to stop before the end of the runway while he still has possible exits ahead of him. The stopping and controlled speed distances therefore totally complement the maximum exit speeds, acting as a safety net.

The method also includes a phase 5 of calculating the speed that the airplane will have on the runway when it has traveled the distance to each of the exits of the runway. This is done again based on the position of the airplane which is taxiing on the runway and its speed, determined in the phase 3, by making an assumption on the trend of the speed of the airplane. Advantageously, it can be assumed that the speed decreases to a complete stop according to a function dependent only on time, for example following a function decreasing linearly over time. However, it is also possible to envisage a more complex function dependent on the time and also on other parameters measured during the braking phase. In any case, the assumption that has to be made is the same as in the phase 4. The duly calculated speeds can be less than or greater than the corresponding maximum exit speeds. But, at least one of the exits must be able to be reached with a speed less than or equal to its maximum speed. The pilot must adjust his braking for this to be the case.

Figure 2:
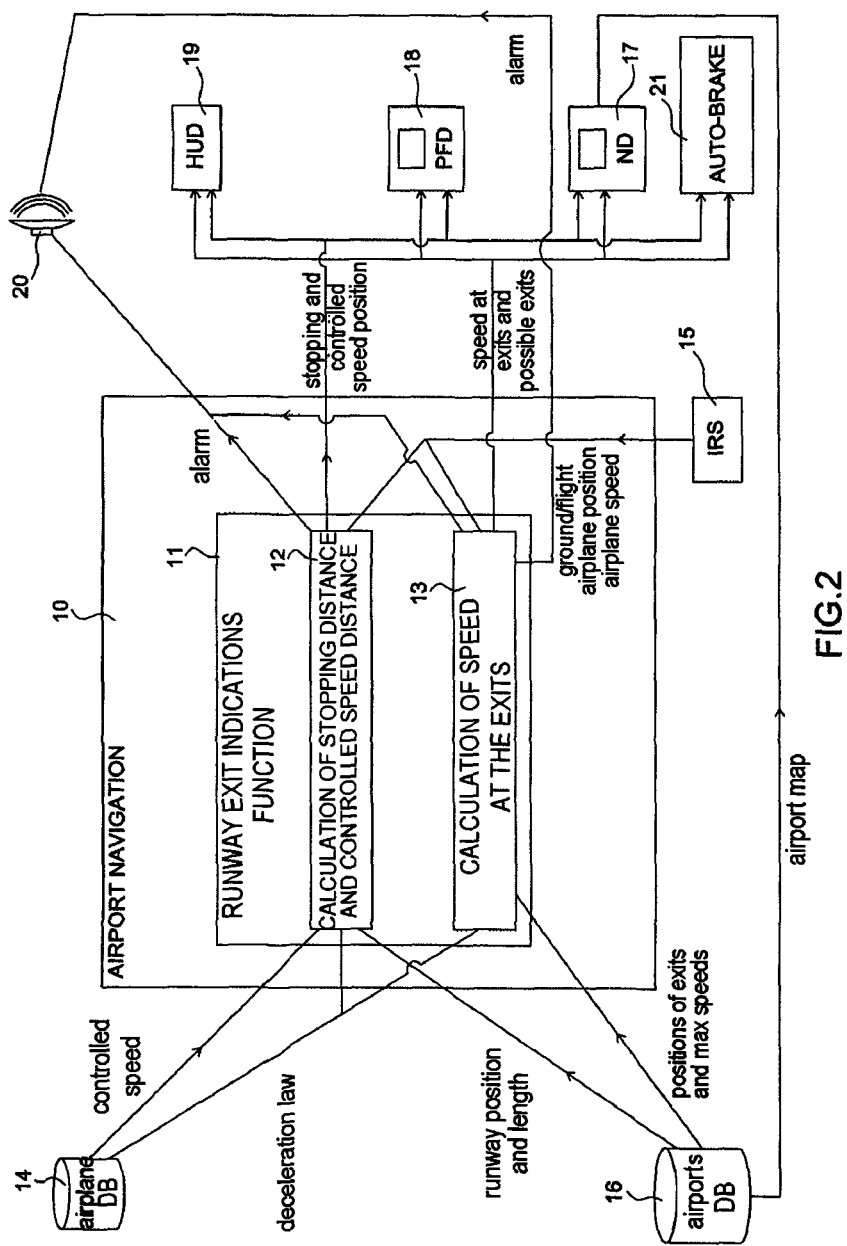

FIG. 2 uses a block diagram to illustrate an exemplary architecture of an "airport navigation" component implementing the system according to the invention.

An "airport navigation" component 10 comprises a runway exit indication function 11, itself comprising a subfunction 12 for calculating stopping distance and controlled speed distance and a subfunction 13 for calculating speed at the exits.

The function 12 for calculating stopping distance and controlled speed distance receives from an airplane database 14 the controlled speed of the airplane, that is, the speed below which it is capable of performing any maneuver while taxiing, and the deceleration law of the airplane, which is a function describing the trend of the speed of the airplane in the braking phase on the runway. The term airplane database is in this context generic, also covering a means of storing the constants used, such as, for example, the predefined deceleration law. The function 12 also receives a description of certain elements of the runway such as its position and/or its length supplied by an airport database 16 containing at least the information required for the runway of the airport on which the airplane is taxiing. If this database contains several runways of the same airport, even of several airports, a function for selecting the appropriate runway is assumed to make this selection, but is not directly involved in the framework of this invention. Finally, it receives the flight or taxiing status and the position and the speed of the airplane sent by a positioning module such as a satellite triangulation positioning system or such as an inertial system 15, hitherto referred to as IRS 15 (inertial reference system). If necessary, this position and this speed are accompanied by the measured deceleration. The function 12 thus estimates the position that the airplane will have when it reaches its controlled speed and when it is stopped, this based on the position and the speed measured by the IRS module 15 and if its speed changes according to the deceleration law supplied by the airplane database 14. The deceleration law can possibly be the constant function equal to the measured deceleration. Advantageously, in the exemplary embodiment of the figure, the stopping and controlled speed positions calculated by the function 12 are sent to an "auto-brake" system 21, having an enhanced mode allowing not for a fixed deceleration level braking, but a modulated braking. The latter automatically adjusts the braking, in particular to ensure that the stopping and/or controlled speed distances are less than the distance remaining to reach the end of the runway. However, the pilot can still take control if necessary simply by operating the brake levers. For example, the function 12 for calculating stopping distance and controlled speed distance also raises alerts when the stopping distance or the controlled speed distance is greater than the distance remaining to reach the end of the runway, the alarms being sent to an audible alert module 20. An audible alert can be a very good reason for the pilot to resume manual braking. However, other warning mechanisms can be envisaged, in particular visual alert mechanisms on onboard screens. For example, the stopping and controlled speed positions are made available to the crew by display on a module 17 called "Navigational Display", hereinafter called ND module, which is a device comprising a screen and offering graphical display services. Jointly receiving the maps of the airport installations sent by the airport database 16, the ND module 17 can display a graphic representation of the airplane and of the runway cyclically updated, commonly called "moving map". The stopping and controlled speed positions can be represented on this graphically using a particular symbol system, such as bars positioned cross-wise to the runway. If these bars stay for too long beyond the end of the runway, the pilot can here again decide to resume the manual braking procedure. Such a bar-based graphic representation can also be displayed on other devices at the same time. In the exemplary embodiment of the figure, the stopping and controlled speed positions are also made available to the crew on a module 18 called "Primary Flight Display", hereinafter designated PFD module, which is another graphic display device comprising a screen, and/or on a module 19 called "Head-Up Display", hereinafter designated HUD module, which is a device enabling the pilot to view information while looking through the window in front of him.

It is important to note that even in the purely manual braking mode, all the audible and visual alert mechanisms based on the distances calculated by the function 12 can assist the pilot. The implementation of the "auto-brake" module 21 is given here purely as an example.

The function 13 for calculating the speed at the exits also receives from the airplane database 14 the deceleration law of the airplane describing the trend of the speed of the airplane in the braking phase on the runway. The function 13 also receives a description of the runway sent by the airport database 16, at least in terms of positions of the exits and of maximum speed to take these exits. It also receives the flight or taxiing status and the position and the speed of the airplane sent by the IRS module 15, possibly accompanied by the measured deceleration. The function 13 thus estimates the speed that the airplane will have when it has traveled the distance to reach each of the exits of the runway, and this based on the position and the speed measured by the IRS module 15, and if its speed changes according to the deceleration law received from the airplane database 14. The deceleration law can possibly be the constant function equal to the measured deceleration. Advantageously, in the exemplary embodiment of the figure, the speeds at the exits calculated by the function 13 are sent to the "auto-brake" system 21. The latter automatically adjusts the braking, particularly to ensure that at least one exit can be reached with a speed less than its maximum speed. However, the pilot can always take control simply by operating the brake levers, such as in an audible alert case. For example, the function 13 for calculating the speed at the exits also raises alerts when no exit can be taken, the alarms being sent to the audible alert module 20. Here again, visual alert mechanisms can also be envisaged. The exiting speeds are made available to the crew by display on the ND module 17, accompanied for each of them with the indication of the fact that the associated exit can or cannot be taken. Jointly receiving the maps of the airport installations sent by the airport database 16, and in particular the position of the exits along the runway, the ND module 17 can represent all or some of the exits using a symbol system indicating whether or not it can be taken, such as by using a two-color code. If no exit is displayed with the color indicating that it can be taken, the pilot can here again decide to resume the manual braking procedure. Such a symbol system based on two colors can also be displayed on other devices at the same time. In the exemplary embodiment of the figure, the exiting speeds are also made available to the crew on the PFD module 18 and on the HUD module 19.

It is important to note that even in the purely manual braking mode, all the audible and visual alert mechanisms based on the speeds at the exits calculated by the function 13 can assist the pilot. The implementation of the "auto-brake" module 21 is given here purely as an example.

Figure 3:
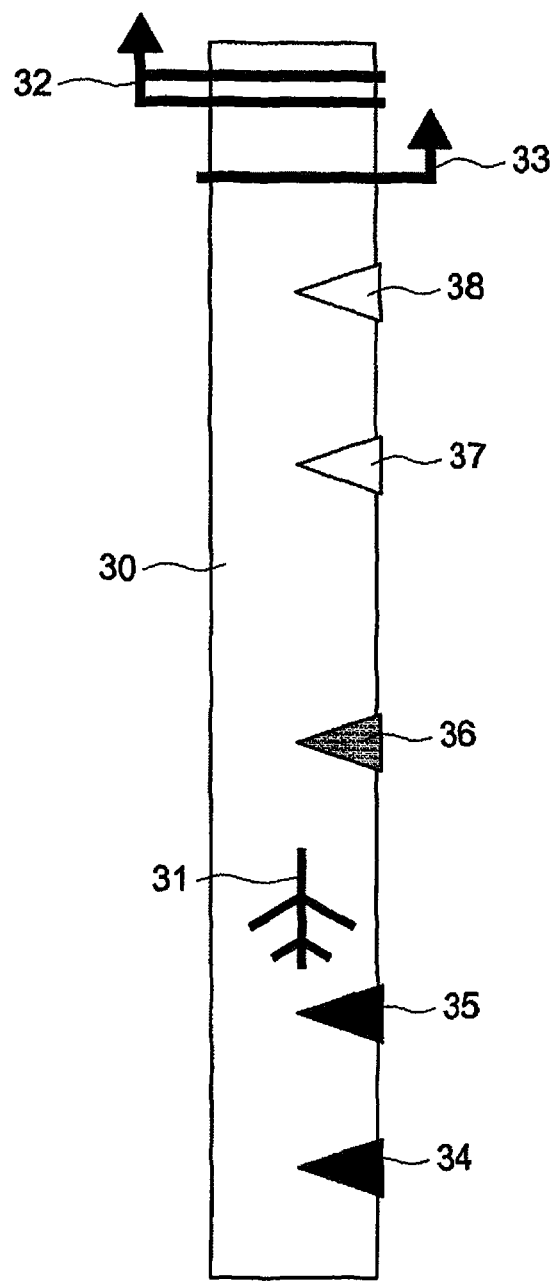

Thus, FIG. 3 uses a screen view to illustrate an exemplary graphic display using the distances and speeds calculated by the functions 12 and 13 of the exemplary embodiment of FIG. 2. For example, the display device can be the ND 17.

In the exemplary embodiment of the figure, the runway is represented by a rectangle 30 and the airplane by a symbol 31 in the form of an aircraft seen from above. The position of the symbol 31 in the form of an aircraft along the rectangle 30 represents the progress of the airplane on the runway, the start of the runway being at the bottom and the end of the runway being at the top. Thus, the symbol 31 in the form of an aircraft moves from bottom to top throughout the taxiing phase of the airplane on the runway. As a variant, the airplane can be represented in a fixed position, the runway and the symbols moving towards it. In the exemplary embodiment of the figure, the stopping distance of the airplane is represented by a double bar 32 and the distance to reach the controlled speed of the airplane is represented by a single bar 33. For example, the bars are terminated at one end in the form of arrows pointing up, indicating the tendency to lengthen the distances. Similarly, the arrows pointing down could indicate the tendency to shorten the distances. Throughout the taxiing phase on the runway, the bars 32 and 33 move from top to bottom and from bottom to top according to the intensity of the braking applied by the pilot or by the "auto-brake" system, the arrows indicating the direction of movement of the bars. It is possible to envisage a mechanism avoiding any possible jerking of the bars from top to bottom, rapid and low amplitude jerking resembling vibrations, due to the recalculation of the distances represented by the bars at very short time intervals. For example, the position of the bars could be updated only if the recalculated distances have varied beyond a certain threshold relative to the distance already represented by the bars.

In the exemplary embodiment of the figure, the exits already passed by the airplane, that it consequently can no longer take, are represented by black triangular symbols 34 and 35. However, it would also be possible to envisage no longer displaying any of the exits passed. An exit that the airplane will reach with a speed that is too high if it maintains the braking intensity, that it consequently cannot take if it does not increase the braking, is represented in the exemplary embodiment of the figure by a grey triangular symbol 36. The exits that the airplane will reach at a speed less than or equal to their maximum exit speed by maintaining the braking intensity, that it consequently can take, are represented by white triangular symbols 37 and 38 in the exemplary embodiment of the figure. It would also be possible to envisage displaying only those exits that the airplane can take. In this exemplary embodiment, the symbols representing the states of the exits, in other words whether or not they can be taken, differ only by their colors. However, symbols of different shapes according to the status of the exit could be envisaged. In this embodiment based only on colors, it is also possible to envisage a mechanism avoiding any possible blinking of a triangular symbol of any color, blinking due to the recalculation of the exiting speeds at very short intervals. For example, the color of the triangular symbols can be updated only if the recalculated speeds have varied beyond a certain threshold relative to the speed already represented by the color of the triangular symbol. Finally, the braking mode, namely thrust reversal or wheel brakes, can be displayed to the pilot.

It is important to note that the graphic representations of the aircraft on the landing runway, of the exits, of the stopping and controlled speed distances, are given purely by way of example. In practice, other representational choices can be made to implement a system according to the invention.

The invention also has the advantage of having only a minimal impact on the current onboard equipment and not requiring any additional communication infrastructure, in particular with the airport. Consequently, its hardware and software integration cost is relatively low. Furthermore, the invention has no impact on any operational procedure: the control procedures performed by the ground personnel and the piloting procedures performed by the crew remain absolutely unchanged. The cost of training personnel is therefore minimal. Finally, the invention uses only data already described in the standardized aeronautical databases, in particular the detailed description of the landing runways of the airports for which it requires no changes.

It will be readily seen by one of ordinary skill in the art that the present invention fulfills all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method to assist in adjusting a braking intensity of an aircraft on a landing runway comprising the steps of:
   recovering data concerning a runway where the aircraft is landing, including points characterizing an end of said runway, a length of said runway and exit points of said runway;
   determining an axis of said runway;
   acquiring a position of the aircraft on the runway and a speed of the aircraft in a taxiing phase;
   calculating a stopping distance that the aircraft will have traveled on the runway when the aircraft has reached a zero speed, taking into account for calculating only the speed component along the axis of the runway and assuming for calculating that the speed of the aircraft decrease according to a predefined time function;
   displaying to a pilot a graphical representation of said runway, said end points and said exit points of said runway, said aircraft position on said runway and said calculating stopping distance,
   wherein a difference between the displayed stopping distance and the displayed end and exit points of the runway providing guidance to the pilot to increase or decrease the braking intensity.

2. The method to assist in adjusting the braking intensity of an aircraft on a landing runway as claimed in claim 1, wherein the speed is calculated assuming that the speed of the aircraft decreases according to a time-dependent function only.

3. The method to assist in adjusting the braking intensity of an aircraft on a landing runway as claimed in claim 2, wherein the speed is calculated assuming that the speed of the aircraft decreases according to a linear time function.

4. The method to assist in adjusting the braking intensity of an aircraft on a landing runway as claimed in claim 1, wherein the speed is calculated assuming that the speed of the aircraft decreases according to a function depending on time and on other variables characterizing an instantaneous braking quality given a state of the runway or of the aircraft and being estimated when taxiing on this runway.

5. The method to assist in adjusting the braking intensity of an aircraft on a landing runway as claimed in claim 1, wherein the axis of the runway is determined by extraction from an airport database containing a position of thresholds and of the end point of the runway or containing a geographic orientation of the runway.

6. The method to assist in adjusting the braking intensity of an aircraft on a landing runway as claimed in claim 1, wherein the axis of the runway is obtained by calculation based on coordinates of notable points of the runway on which the aircraft is.

7. The method to assist in adjusting the braking intensity of an aircraft on a landing runway as claimed in claim 1, wherein the axis of the runway is supplied by on-board systems.

8. A system to assist in adjusting the braking intensity of an aircraft on a landing runway comprising:
- a means of acquiring the position of the aircraft on the runway and its speed in the taxiing phase;
- a means of storing data concerning the runway where the aircraft is landing including end point, length, exit points, and a predefined deceleration law;
- a function for calculating the stopping distance that the aircraft will have traveled on the runway, the speed being calculated assuming that the speed of the aircraft decreases according to the deceleration law wherein the speed is calculated by taking into account only the speed component along the axis of the runway;
- a display module for displaying a graphical representation of said runway including said end of said runway, said exit points, said position of said aircraft on said runway and said stopping distance, wherein the position characterizing a runway start or end point and the length of the runway are stored in the storage means and the stopping distance is calculated by the calculation function, a difference between the displayed stopping distance and the displayed end and exit points of the runway providing guidance to the pilot to increase or decrease the braking intensity.

9. The system to assist in adjusting the braking intensity of an aircraft on a landing runway as claimed in claim 8, comprising an audible alert module raising an alert if the stopping distance of the aircraft is greater than a distance remaining to reach the end point of the runway or if no exit can be reached at a speed less than or equal to its maximum exit speed.

10. The system to assist in adjusting the braking intensity of an aircraft on a landing runway as claimed in claim 8, comprising a visual alert module raising an alert if the stopping distance of the aircraft is greater than a distance remaining to reach the end point of the runway or if no exit can be reached at a speed less than or equal to its maximum exit speed.

11. The system to assist in adjusting the braking intensity of an aircraft on a landing runway as claimed in claim 8, wherein a tendency to shorten or lengthen the stopping distance of the aircraft is graphically displayed.

12. The system to assist in adjusting the braking intensity of an aircraft on a landing runway as claimed in claim 8, wherein a graphical representation of an exit already passed is different from a graphical representation of an exit not yet passed.

13. The system to assist in adjusting the braking intensity of an aircraft on a landing runway as claimed in claim 8, wherein only exits not yet passed are graphically represented.

14. The system to assist in adjusting the braking intensity of an aircraft on a landing runway as claimed in claim 13, wherein only exits that can be reached at a speed less than their maximum exit speed are graphically represented.

15. The system to assist in adjusting the braking intensity of an aircraft on a landing runway as claimed in claim 8, wherein graphical representation of exits that can be reached at a speed less than or equal to their maximum exit speed is different from a graphical representation of the exits that cannot be reached at a speed less than or equal to their maximum exit speed.

16. The system to assist in adjusting the braking intensity of an aircraft on a landing runway as claimed in claim 8, wherein a moving graphical representation of the stopping distance do not jerk about.

17. The system to assist in adjusting the braking intensity of an aircraft on a landing runway as claimed in claim 8, wherein a fixed graphical representation of exits that can be reached or not at a speed less than or equal to their maximum exit speed do not blink.

* * * * *